April 20, 1937.   R. G. WHITLOCK ET AL   2,077,603
SAFETY REFILLABLE DISPENSER AND CONTROL THEREFOR
Filed Nov. 14, 1934   8 Sheets-Sheet 4

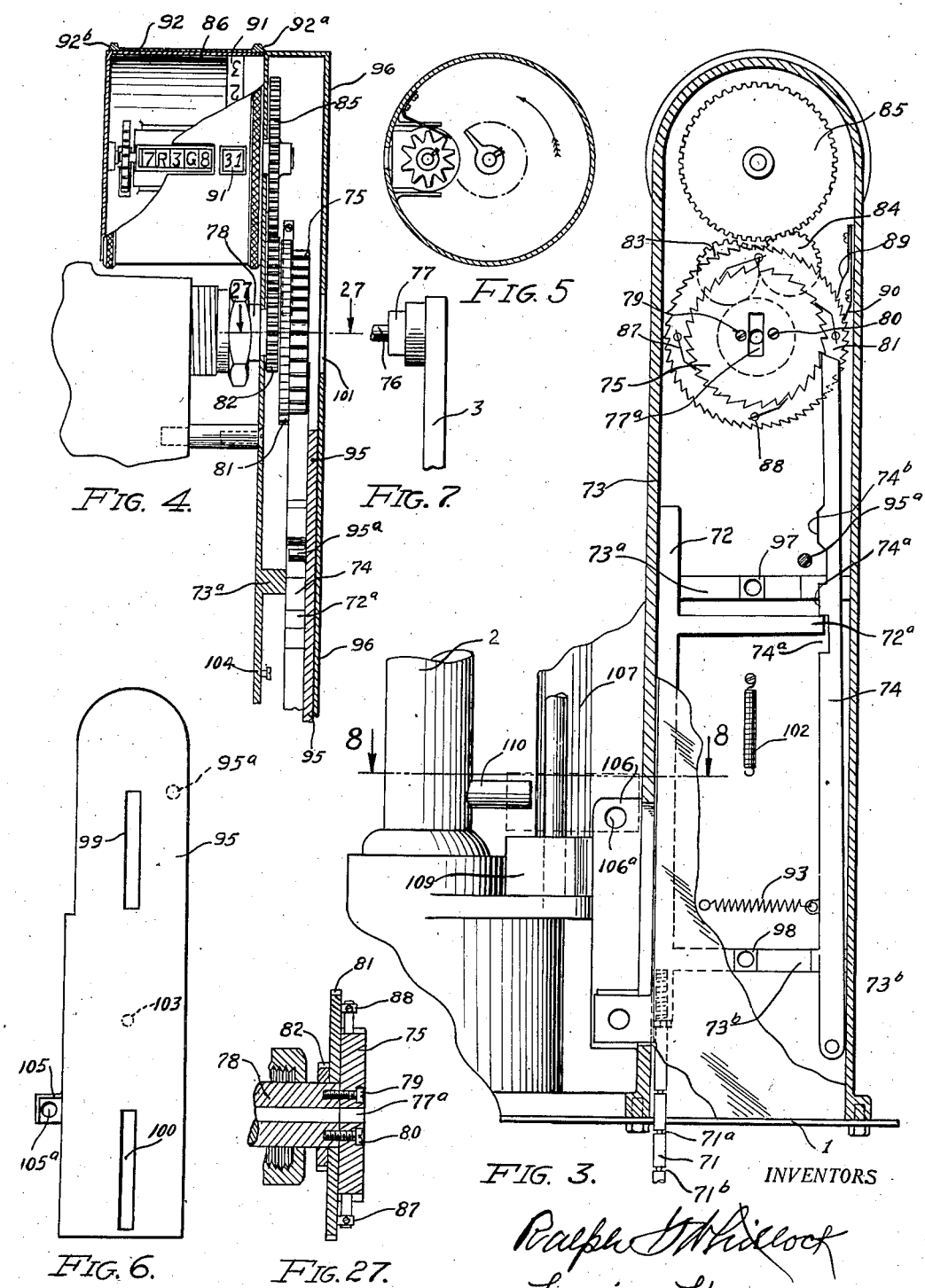

INVENTORS
Ralph G. Whitlock
Lewis Sharp

April 20, 1937.  R. G. WHITLOCK ET AL  2,077,603
SAFETY REFILLABLE DISPENSER AND CONTROL THEREFOR
Filed Nov. 14, 1934  8 Sheets-Sheet 5

INVENTORS
Ralph G. Whitlock
Lewis Sharp

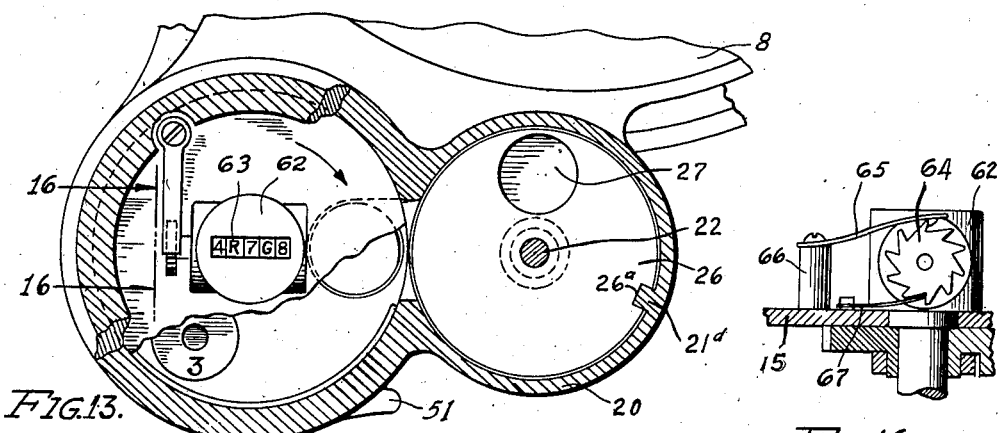
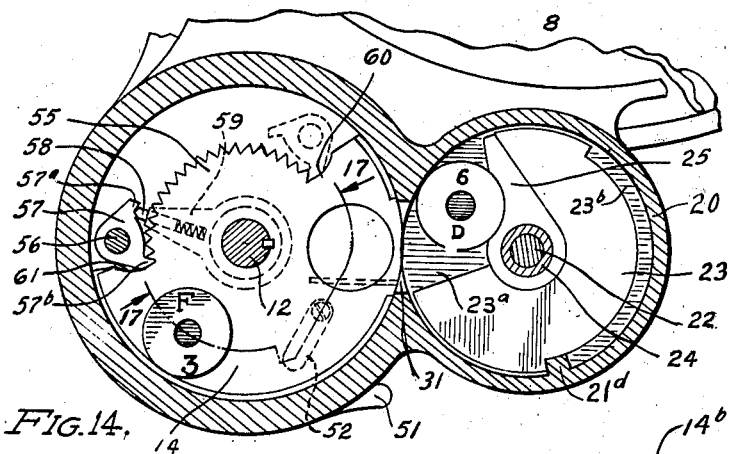
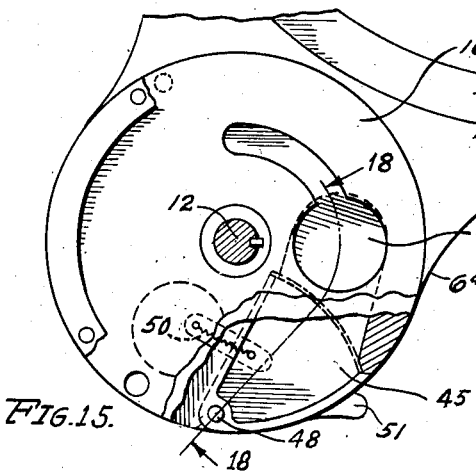
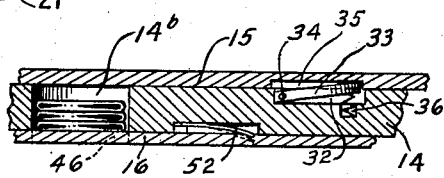
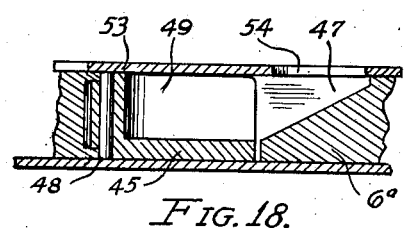

April 20, 1937.    R. G. WHITLOCK ET AL    2,077,603
SAFETY REFILLABLE DISPENSER AND CONTROL THEREFOR
Filed Nov. 14, 1934    8 Sheets-Sheet 7
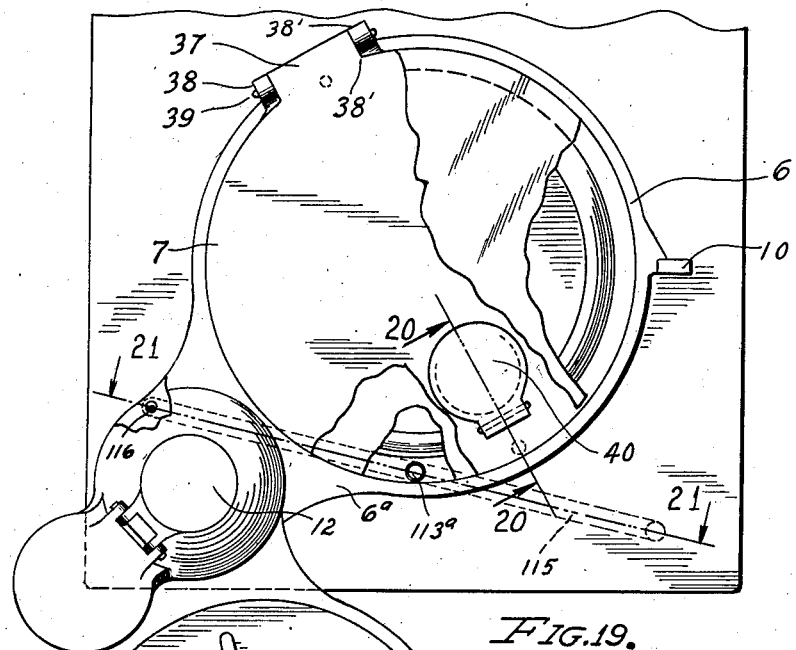
FIG. 19.
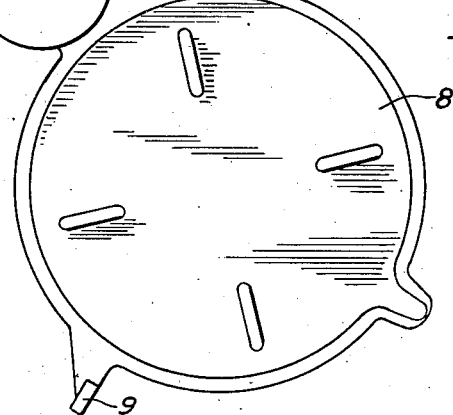
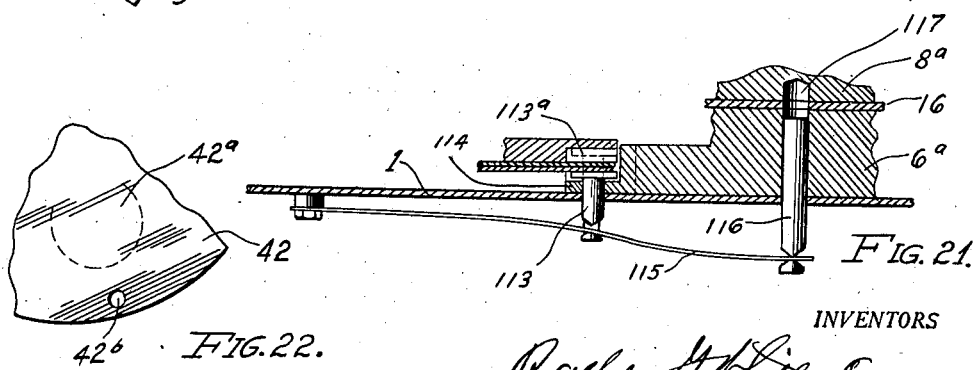
FIG. 20.
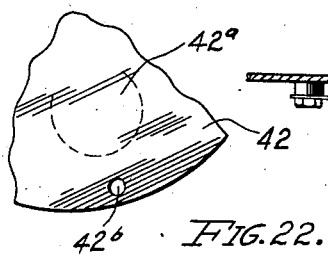
FIG. 22.
FIG. 21.
INVENTORS April 20, 1937.   R. G. WHITLOCK ET AL   2,077,603
SAFETY REFILLABLE DISPENSER AND CONTROL THEREFOR
Filed Nov. 14, 1934   8 Sheets-Sheet 8

INVENTOR.
Ralph G. Whitlock
Lewis Sharp

Patented Apr. 20, 1937

2,077,603

UNITED STATES PATENT OFFICE 2,077,603

SAFETY REFILLABLE DISPENSER AND CONTROL THEREFOR

Ralph G. Whitlock, Los Angeles, and Lewis Sharp, Huntington Park, Calif., assignors to Federal Foundation Inc., Las Vegas, Nev., a corporation of Nevada Application November 14, 1934, Serial No. 753,042

26 Claims. (Cl. 221—67)

The present application is a continuation in part of our application Serial Number 747,356 filed October 8th, 1934.

This invention relates to improvements in telltale apparatus and appliances and finds particular embodiment in dispensing apparatus. This is attained by the instrumentality of a fluid displacement meter which simultaneously counts, measures and indicates the exact quantity of fluid expressed out of the measuring chamber of the dispensing apparatus, whether the entire contents of this measuring chamber is withdrawn at one time or any fractional part thereof.

Reference is hereby made to our co-pending application Serial Number 747,356 filed October 8, 1934, which embodies some of the general construction and parts disclosed in the present apparatus.

The present invention resides more particularly in the means by which registering and controlling means are actuated and controlled by liquid level variations and means responsive to liquid level variations. One of the objects of the present invention is to provide improved means whereby liquid level variations may control the operation of registering means and to provide means responsive to liquid level variations whereby increasing and decreasing of the liquid contents of a liquid container may be controlled. Another object is to provide means whereby the controlling means may be adjusted.

The present invention contemplates apparatus more particularly applicable to oil dispensing apparatus for use at oil and gasoline dispensing stations and is applicable to the oil tanks usually used at such stations. At such stations it is desirable to maintain complete control over the dispensing tanks at all times and to keep a complete record of the number of times oil is put into the tank and the amount. Also the amount taken out. It is an object of the present invention to make such control possible and to make such records.

A further object is to provide apparatus for the purpose which is durable and not easily injured in operation and which cannot be operated without leaving a record of its operation.

A further object is to provide means for controlling the dispensing apparatus in such a manner that, when a predetermined level of the liquid in the apparatus is reached, the device is automatically locked against operation.

Another object is the provision of means for releasing the dispensing mechanism for operation upon the completion of each authorized filling operation, and another object is to provide means for making the dispensing mechanism inoperative when the liquid reaches a predetermined low level.

Another object of our invention is to so safety a refillable container by the introduction of mechanical elements into or over all necessary openings that entrance into the container may not be had without leaving evidence of a record to enter the container or an attempt to do so.

A still further object is to provide means and so distribute and arrange the parts that the apparatus is made accessible for refilling before a low level of the liquid contained is reached whereby the dispensing operation is prohibited by locking of the dispensing parts.

Further objects and advantages of the present invention will become apparent from the following specifications when considered in connection with the accompanying drawings in which:

Fig. 3 is a side elevation partly in section of the control mechanism of the device;

Fig. 4 is a fragmentary sectional elevation of the control mechanism substantially in agreement with Fig. 3;

Fig. 5 is a fragmentary view showing more in detail the connection between the dispensing device and the recording device;

Fig. 6 is a front elevation of the cover plate and protector shown in section in Fig. 4;

Fig. 7 is a fragmentary of the operating crank handle.

Fig. 13 is a plan view of the refill and dispensing control device in which parts are cut away to show more clearly the construction, substantially on the line 13—13 of Fig. 12;

Fig. 14 is a plan view in section substantially on the line 14—14 of Fig. 12;

Fig. 15 is a plan view in section substantially on the line 15—15 of Fig. 12;

Fig. 16 is a fragmentary view taken substantially on the line 16—16 of Fig. 13 in the direction of the arrows;

Fig. 17 is a fragmentary sectional view taken substantially on the line 17—17 of Fig. 14;

Fig. 18 is a fragmentary sectional view taken substantially on the line 18—18 of Fig. 15;

Fig. 19 is a plan view of the refill and dispensing control device partly opened.

Fig. 20 is a fragmentary view taken substantially on the line 20—20 of Fig. 19;

Fig. 21 is a fragmentary view taken substantially on the line 21—21 of Fig. 19;

Fig. 22 is a fragmentary plan view of the paper sealing disc showing the partial perforation;

Fig. 27 is a fragmentary section on the line 27—27 of Fig. 4.

Figure 1:
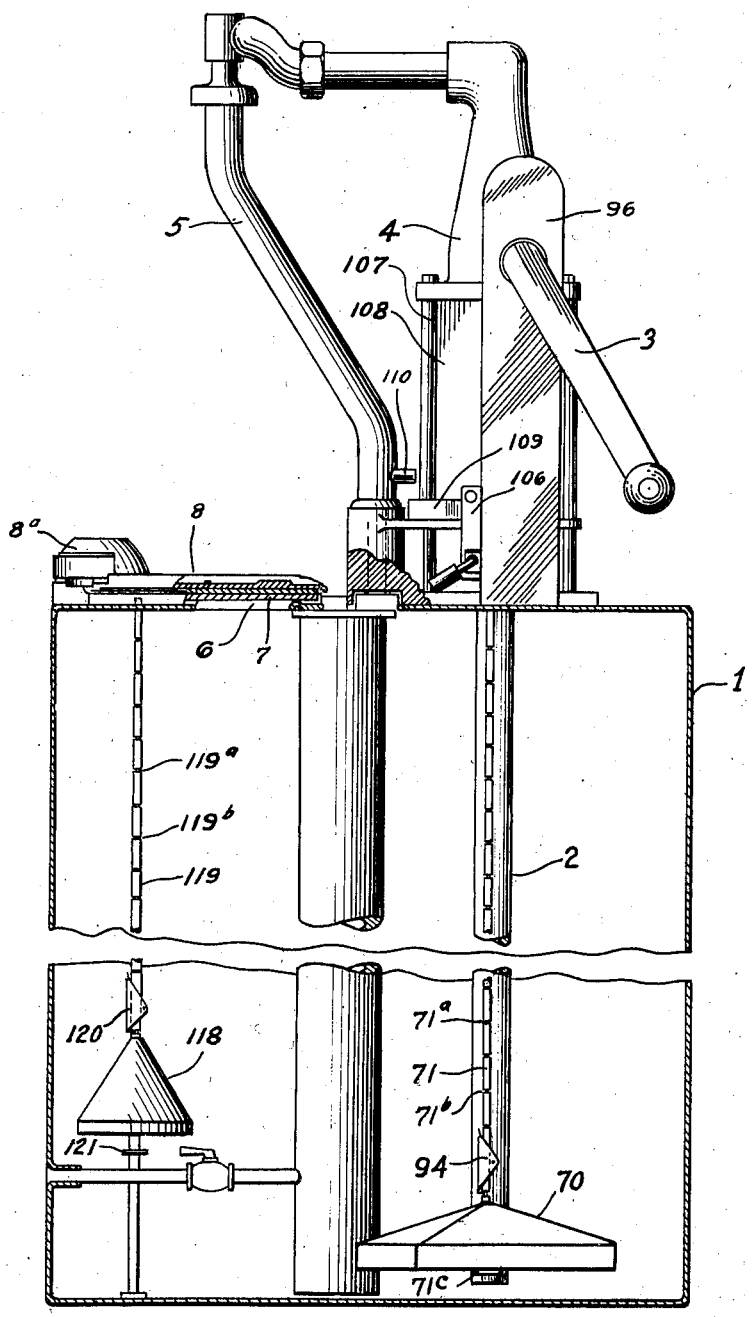
Fig. 1 is a side elevation partly in section of a device embodying our invention.

Referring to the drawings with more particularity, the numeral 1 indicates an oil dispensing tank such as is ordinarily used in dispensing stations. This tank is fitted with a draw pump of any suitable commercial type of which the pipe 2 is the intake and which is operated by the crank handle 3. By means of the pump, oil is drawn into the chamber 4 from which it is discharged. The spout 5 may be swung sidewise for the dispensing operation. It will be observed that the inlet or intake pipe 2 has its lower end spaced immediately above the bottom of the fluid container 1.

In the top plate of the tank is shown a circular opening. This opening is outlined and surrounded by a rim casting 6 which has an extension 6ᵃ. The opening into the tank and the corresponding opening through the rim casting 6 are normally maintained closed by a lower cover 7 and an upper cover 8. The latter is shown made with a perforated lug 9 normally registering with a perforated lug 10 of the rim casting 6, and a padlock 11 is shown inserted in the perforations of these lugs when the lugs are brought together in the closed position of the cover. This padlock forms the first control element of the apparatus.

The upper cover 8 is pivoted at 12 for horizontal movement to be brought into open position, as shown in Fig. 19, and thereby exposing the lower cover 7. The operation of the upper cover is controlled in a manner which will soon be described.

The pivot 12 is held stationary by passing through the tank plate and having a nut 13 engaging screw threads at the lower end of the pivot. An annular plate 14 is rigidly secured to the pivot 12 near its upper end. The upper cover terminates in a substantially hemispherical dome 8ᵃ axially aligned with the pivot, and this dome carries the upper circular plate 15 and a lower circular plate 16, both of which are rigidly secured to the dome portion of the cover 8 by means of screws 17 and 18.

The cover 8, in rotating on its pivot, carries with it the two plates 15 and 16 while the annular plate 14 remains stationary with the pivot 12. The pivot 12 is held immovable rotatively relative to the rim casting 6 and extension 6ᵃ by means of a key 12ᵃ. The plate 14 has an annular flange 19 downwardly extending to fill the space between the plates 15 and 16 and thereby to maintain the cover 8 vertically immovable on the pivot 12.

Figure 12:
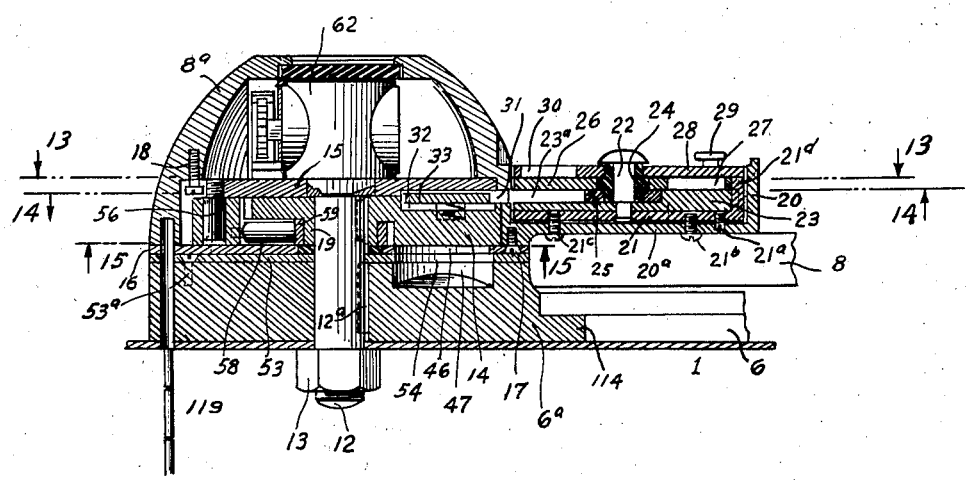
Fig. 12 is a sectional view of the refill and dispensing control device in side elevation and substantially on the line 12—12 of Fig. 10.
Figure 25:
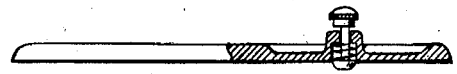
Fig. 25 is a section substantially on the line 25—25 of Fig. 24.
Figure 24:
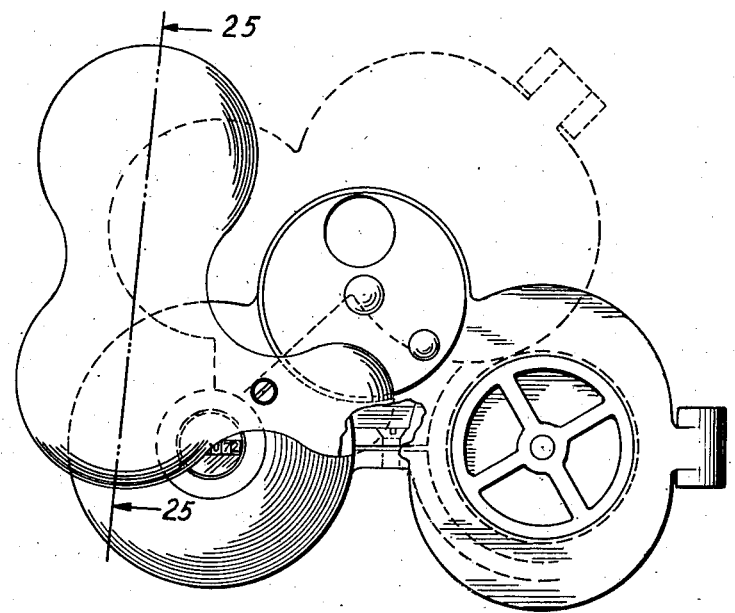
Fig. 24 is a plan view of the device shown in Fig. 23 showing the lid partially opened and parts cut away.
Figure 23:
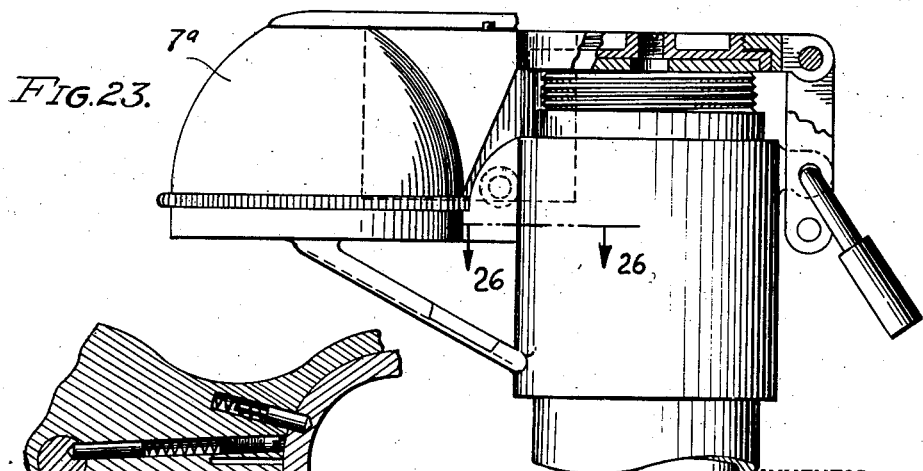
Fig. 23 is a view in side elevation of a modified form of our refill and dispensing control device in which parts are cut away and parts are shown in section.
Figure 26:
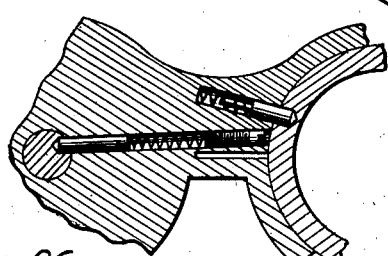
Fig. 26 is a fragmentary section substantially on the line 26—26 of Fig. 23.

The dome portion 8ᵃ of the cover 8 is made with a box-shaped extension 20 within the chamber of which is a circular token carrier comprising a mounting disc 21 having therein a locating stud 21ᵃ which projects downwardly and engages in a recess in the bottom portions 20ᵃ of the box-shaped member 20 when the token carrier is in normal position as shown in Fig. 12. Screws 21ᵇ and 21ᶜ secure the mounting disc 21 to the bottom portion 20ᵃ. Centrally located and secured into the mounting disc 21 is a stud 22. Freely and concentrically disposed on the stud 22 is a disc 23 having a recess 23ᵃ and an elongate annular cutaway portion or notch 23ᵇ. A lug 21ᵈ at the rim of the mounting disc 21 extends upwardly and engages in the elongate notch 23ᵇ, shown in Fig. 14, to limit the rotary movement of the disc 23. Within the recess 23ᵃ and securely mounted on the bush 24 is a finger 25 free to move rotatably with the bush 24 and within the limits of the recess 23ᵃ. Above the disc 23 concentric with the stud 22 is a separating disc 26 within which the central opening of which the stud and bush 24 may rotate freely and in which is a token opening 27. In the edge of the disc 26 is a notch 26ᵃ (see Fig. 13) which registers with the lug 21ᵈ and is held by it from rotary movement. Above the disc 26 is a cover disc 28 concentrically and securely mounted on the bush 24 and having a handle stud 29 by which it may be manually rotated and having a token opening 30 therein. The head of the stud 22 prevents the cover disc 28 from being removed and the other parts of the token carrier from becoming removed.

When, by the handle stud 29, the cover disc 28 is rotated a token inserted into the token opening 30 is carried round until the token opening 30 registers with the token opening 27 of the disc 26, the token will drop into the token opening 27. As the cover disc 28 and the finger 25 are secured to the rotatable bush 24 the finger 25 is carried round as the cover disc 28 is rotated and with it the disc 23 by the action of the finger 25. The finger 25 and the disc 23 are so disposed relative to the cover disc 28 that when the token opening 30 registers with the token opening 27 the recess 23ᵃ is so positioned that a token may freely drop through openings 27 and 30 into the recess 23ᵃ. If the cover disc 28 is rotated in the opposite direction when a token is in the recess 23ᵃ the token is carried round by the finger 25 until the recess 23ᵃ is opposite the token opening 31 in the well of the chamber, as is shown in Fig. 14, when further movement of the disc 23 is arrested by engagement with the lug 21ᵈ. When the disc 23 is stopped the finger 25 pressing against the token pushes it out through the opening 31 into the dome portion of the cover 8 and to reach the position indicated in the full outline in Fig. 13. The plate 14, at this point has a recess 32 in which a catch is disposed. This catch, as best shown in Fig. 17, comprises a substantially circular disc 33 hinged at one side on a pin 34 and held upwardly tilted into the recess 35 of the upper plate 15 by means of a suitable spring 36. This catch normally locks the upper cover 8 against rotation on its pivot, but when the token has been pushed on to the stationary plate 14, it depresses this catch, releasing cover 8, when it may be swung into the position shown in Fig. 19.

The lower cover 7 is now exposed and is shown in Fig. 19 hinged at one edge for vertical movement by the lug 37 and the lugs 38 and 38' forming a hinge on the pin 39. Diametrically opposite the hinge is a small hinged door 40 which may readily be lifted to disclose an opening 41 in the cover 7 through which a seal 42 is disclosed. This seal is preferably made of fragile material, such as heavy paper, and is at 42ª partially perforated to facilitate breaking, as is shown more clearly in Fig. 22. When placed in position beneath the cover 7 and resting on the annular edge of the rim casting 6 closing the opening into the tank, the perforated portion 42ª is disposed directly beneath the opening 41 in the cover 7 and is located by means of a small perforation 42ᵇ into which a pin 43, which is secured in the cover 7 and is shown in detail in Fig. 20, engages. When the cover 40 is raised, an operator may push his finger through the opening 41 and perforate the seal. When the seal is broken the operator may then, with his finger, disengage the catch 44 from the notch in the pin 43 and thus release the cover 7 which may then be raised to disclose the whole of the seal 42. The seal 42 may then be removed to permit filling of the tank. The required quantity of oil may be put into the tank and a suitable record made upon the seal. A new recording seal may then be placed and the cover 7 closed to permit the catch 44 to again engage in the notch in the pin 43 and thus lock the cover 7 in position, whereupon the upper cover 8 may then be swung into its normal position.

During this opening and closing operation of the upper cover 8, the token has been delivered into a discharger 45 in the following manner: While the upper cover 8 was swung into open position, the token was held in the recess of the upper plate 15 and carried forward with that plate. There is a second recess 14ᵇ in the stationary plate 14, forming a token magazine (see Fig. 17) and this magazine is positioned to register with the recess 35 in the upper plate 15 when the cover 8 is fully opened and to permit the token to drop from this recess into the magazine. The magazine is proportioned to hold a number of tokens. Each token carries on its face recording symbols by means of which the identity of the persons manipulating the control mechanism may be established.

In the lower plate 16 is provided a similar opening 46 which, when the cover 8 is fully opened, registers with the magazine to permit the lowermost token in the magazine to drop into this opening 46 and to be carried with the plate 16, when the cover is returned, to a position directly above a chute 47 cut into the body of the extension 6ª of the rim casting 6, as best shown in Figs. 15 and 18. The discharger 45 is a triangular shaped member hinged to swing horizontally on a pin 48 and has a chamber 49 which opens opposite the hinge to register with the token chute 47 when the discharger is in normal position, as in Fig. 15. A suitable spring 50, shown only in broken lines in Fig. 15, is arranged to yieldingly hold the discharger in normal position. The discharger is made with a finger lug 51 by means of which the discharger may be swung on its pivot to expose a token which has come into the chamber 49 through the chute 47. When the token is thus exposed, it may be removed by an operator. The discharger then is returned to normal position by action of the spring 50.

When upper cover 8 together with the dome portion 8ª and parts therein contained, are in assembled form, the plate 16 forms a closing member to the chamber in the dome. A corresponding plate 53 is secured by a screw 53ª to the member 6ª. The plate 53 also has a token opening 54 which registers with the opening to the chute 47, as seen in Figs. 12 and 18.

In the stationary plate 14 is a spring finger 52, seen in Figs. 14 and 17, which normally rides against the plate 16 and under which the token is forced to travel when the cover 8 is returned to its closed position. This finger forms an additional safeguard against unauthorized operations by preventing a person having succeeded in reinserting the discharged token through the chute 47 into the token opening 46 from swinging the upper cover 8 open because, in attempting such opening movement, the token will strike the forward end of the spring finger 52 and there be arrested.

In order to make the device of the invention operable, it is necessary to provide a full stroke mechanism, and such mechanism, in Fig. 14, comprises a stationary segment 55 provided with a series of V-shaped teeth. In the upper plate 15 is fastened a pendent stud 56 on which a rocking pawl 57 is hung, and this rocking pawl is made with spaced projections 57ª and 57ᵇ between which a spring-held plunger 58, of a rotary arm 59, is positioned to operate. While the upper cover 8 is closed, this rocking pawl remains in the position shown in Fig. 14. During the operating movement of the cover, the projection 57ᵇ rides over the teeth of the segment 55 against the pressure of the spring-held plunger 58 until the cover approaches the limit of its movement, at which point the rocking pawl strikes a stationary stop 60, causing the pawl in the first place to swing on its pivot and to assume the position shown in broken lines in Fig. 14, at which position the cover comes to a stop.

The angle of the pawl surface intermediate the two projections becomes sufficiently changed, due to this rocking motion, to force the plunger 58 to slide across the surface of the rocker and to come to a stop against the projection 57ª. When now the cover 8 is returned to closed position, the pawl can slip over the teeth of the segment 55 and when closed position is reached, it strikes a second stop 61, again to become reversed and to stop the cover in closed position. In the drawings, the segment 55 and the stops 60 and 61 are shown cut out of the stationary plate 14, but they may, of course, be separate parts if preferred.

Means is provided for recording each opening operation of the upper cover 8. Such means is here shown to comprise a counter 62 rigidly mounted on top of the stationary pivot 12 and provided on top with a window through which a series of numeral wheels 63 appear. The dome portion 8ª is made with a window positioned directly above this counter through which an inspection of the counter may be made at all times. To the end of the counter shaft is affixed a ratchet wheel 64, and this wheel is engaged by a resilient pawl 65, which in turn is carried on a post 66 of the upper plate 15. This pawl is positioned to turn the wheel 64 one tooth each time the cover is opened and thereby to add a unit in the counter. A backlash pawl 67 is provided to prevent rotation of the ratchet wheel 64 in the opposite direction, (see Fig. 16).

Figure 8:
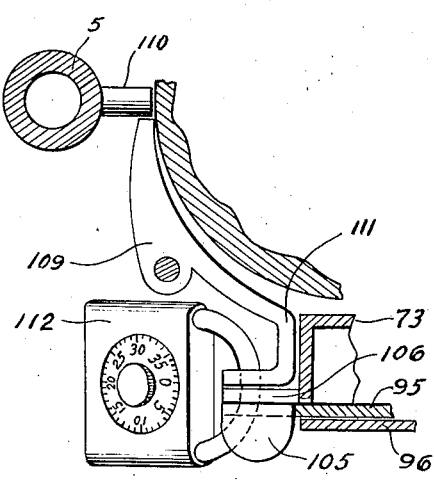
Fig. 8 is a fragmentary view of the locking and stopping device of Fig. 3 shown more in detail, portions of the dispensing device shown in section.
Figure 11:
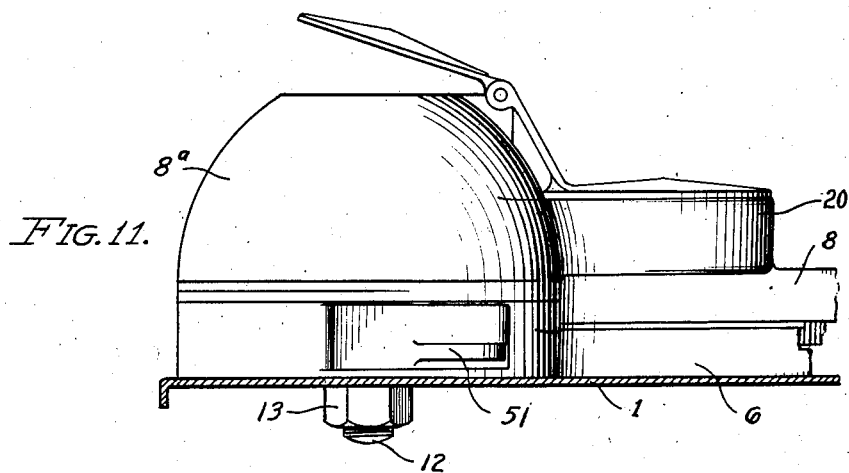
Fig. 11 is a side elevation of the refill and dispensing control device.

When the covers 7 and 8 are fully and properly closed, the pumping mechanism is released for operation in a manner which will be described presently, and liquid may be dispensed until a certain predetermined level is reached. Referring now to Figs. 1, 3 and 8, a float 70 is adjustably carried within the apparatus on a rod 71 and the latter is secured to a slide 72, held in position between a wall of the casing 73 and stationary stops 73a, 73b of this wall. This slide is made with a projection 72a which normally rides on the outer surface of a hinged lockbar 74. Above this bar is mounted a ratchet wheel 75, and this ratchet wheel is centrally perforated to receive a spindle 76 of a crank 3. The hub 77 of this crank is rectangular in shape, preferably, to engage in a like shaped pocket 77a in the ratchet wheel for the purpose of rotating the latter with the crank. The ratchet wheel is made without a hub and is secured on the end of the pump shaft 78 by means of screws 79 and 80. Mounted freely rotatable on the pump shaft 78 is a ratchet wheel 81. Also rotatable on the shaft 78 and secured to the ratchet wheel 81 is a small gear wheel 82 which engages and drives an intermediate gear wheel 83 which in turn engages and drives a second intermediate gear wheel 84 which in turn engages and drives the gear wheel 85 on the shaft of the counting and recording device 86.

When the spindle 76 of the crank 3 is inserted into the hollow spindle 78 of the pump and the rectangular hub 77 engages in the pocket 77a, the pump shaft 78 and the ratchet wheel 75 may be turned by the crank. As the ratchet wheel 75 is turned clockwise, the ratchet wheel 81 is driven in the same rotary direction by means of pawls 87 and 88, which are hingedly mounted on the face of the ratchet 81 and engage in the teeth of ratchet 75. The small gear wheel 82 being secured to the ratchet 81 is also driven in the same rotary direction, and, through the train of gears 83 and 84, the gear wheel 85 is driven in a counter-clockwise rotary direction, turning the shaft of the counting and recording device 86. To prevent a reverse movement of the sprocket wheel 81 and the counting and recording device, pawls 89 and 90, secured to the case 73, engage the teeth of the sprocket wheel 81.

The counting and recording device 86 is in part constructed and arranged in accordance with the standards of such well known devices, having numeral index wheels for ten figures representing units of measure, but in the present invention, an additional numeral index wheel 91 for fractional parts of a unit of measure is included. The numeral index wheel 91 is mounted on a shaft R (Fig. 5) and makes one complete rotation for one unit or for the addition of one unit to the standard numeral index. The shaft R carries at its outer end a finger O and each fractional fluid displacement less than a quart is indicated by index wheel 91, as the finger follows its cycle of movement in an arc less than 360 degrees; however, when the index wheel 91 and shaft make one complete cycle of movement, finger O will mesh with an appropriate tooth of star wheel N which is suitably geared to the shaft controlling the standard index wheels already described, and one of these standard wheels indicates a single or plural emptying of the fluid measuring-chamber 4, concealing the visual numeral indications of said index wheel 91, except one numeral. This arrangement is to prevent manipulation of the device by slight movement of the crank handle forward and backward. The plurality of pawls 87 and 88 are arranged so that one pawl or another will engage a tooth of the ratchet wheel 75 upon slight movement of the handle, and any slight movement of the parts will move the numeral index wheel 91 forward to make a record of fractional parts of a quart. The shield 92 is a cylindrical case covering the counting and recording device 86 and having an opening which may be turned to uncover the numeral index dials. The shield 92 is turned by means of knurled ribs 92a and 92b.

The purpose of the mechanism including the float 70, rod 71, bar 72 and bar 74 is to provide a means whereby operation of the pump may be prevented when the liquid in the tank has reached a predetermined level. When there is sufficient liquid in the tank, the float 70 is borne upward carrying with it the rod 71 and the bar 72, also the projection 72a until the extension 72a rests against the stationary stop 73a, at which time the end of the projection 72a bears against the face of the bar 74 at 74a holding the bar 74 free from the ratchet wheel 75 and permitting the rotation of the ratchet wheel 75 and the associated parts and the pump. When the liquid in the tank has been lowered to a predetermined level, the float 70 is allowed to fall, carrying with it the rod 71 and the bar 72 until the projection 72a reaches the notch 74a of the bar 74 permitting the bar 74 to be forced over by a suitable spring 93 until the end of the bar 74 engages the teeth of the sprocket wheel 75 and prevents further movement of the sprocket wheel 75 and the associated parts and the pump. The float 70 does not fall in its rectilinear movement to a point below the intake of pipe 2 to assure that the fluid in the container will at all times maintain a seal over the intake of pipe 2, and thus prevents air from entering the measuring-chamber of the meter and destroying an accurate record of measurements.

A further provision is made to control the bar 74. A stud 95a is provided on the plate 95 which is positioned normally to clear the bar 74, but, when this bar has been moved forward by the spring 93 to lock the ratchet wheel against rotation, the projection 74b advances into the path of travel of the stud 95a, causing the latter to push the bar out of the way as it travels upward and again when it returns to its initial position. If, in the meantime, the apparatus has been refilled, this stud in its engagement with the projection 74b, operates to release the bar 74 from engagement with the ratchet wheel 75 and thus release the device for operation.

Figure 2:
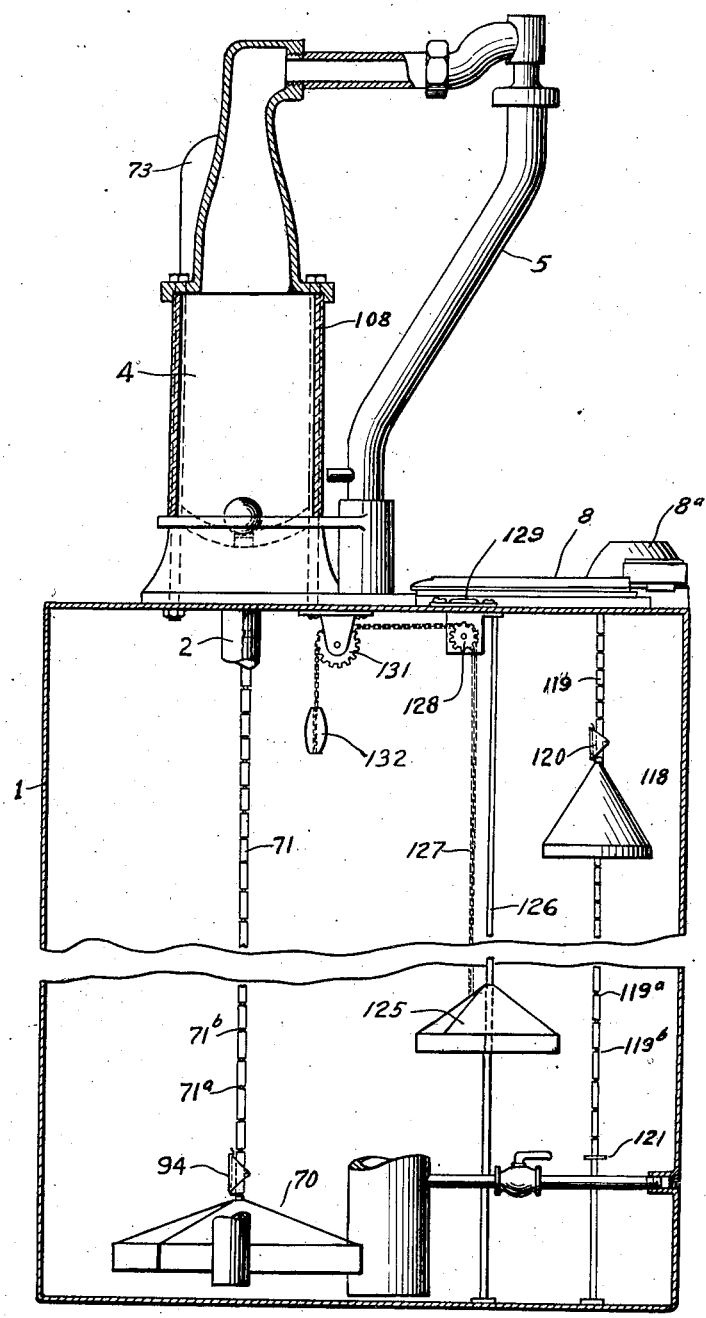
Fig. 2 is a side elevation partly in section showing the same device embodying our invention from the reverse side shown in Fig. 1.
Figure 9:
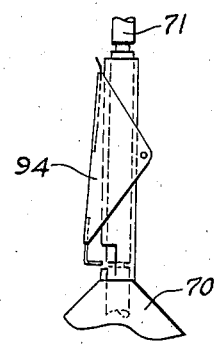
Fig. 9 is an enlarged side elevation of the adjustable stop and fragment of the float.

The float 70 is adjustable upon the rod 71 and is held at any predetermined place on the rod by means of the retainer 94, seen in Fig. 2, and in detail in Fig. 9, which engages in notches 71a and 71b of the rod 71. By this means the pump and recording device may be made inoperable when the liquid in the tank reaches any predetermined level.

It is necessary to prevent the float 70 from sinking low enough to uncover the bottom entrance to the feed pipe 2, in order not to break the liquid seal and so destroy the utility of the meter by setting up figures without dispensing liquid. This may be done in various ways, and the means illustrated comprises a fixed stop 71c at the bottom of the rod 71. When the float is arrested against this stop and the rod reaches bottom position, all substantially as indicated in Fig. 1, it is seen that sufficient liquid remains in the tank to maintain the bottom entrance to the feed pipe 2 sealed.

A plate 95, shown in section in Fig. 4 and in detail in Fig. 6, is positioned inside the case 73 and against the cover plate 96 and is constructed and arranged to slide upward and downward on guides 97 and 98 which engage in slots 99 and 100 in the plate when in position. The upper rounded end of the plate 95 extends to cover the opening 101 in the cover plate 96 when the plate 95 is in its upper position, but when the plate 95 is dropped to its lower position, as shown in section in Fig. 4, the opening 101 is uncovered. The plate 95 is held normally in its upward position by a suitable spring 102 attached to a stud 103 on the plate and a screw 104 on the case 73. A perforated lug 105 projects from the side of the plate and through a suitable slot in the side of the case 73 and registers with a perforated lug 106 extending from the side of the case 73, seen in detail in Fig. 8. When the plate 95 is in upper position the perforation 105a registers with the perforation 106a in the lug 106 and a padlock may be inserted through the perforations to secure the plate 95 in its upper position and retain the upper end of the plate covering the opening 101 in the cover plate 96 and prevent insertion of the crank through the opening 96.

A rod 107 is mounted intermediate the casing 108 of the pump and the spout 5, and this rod serves to support a cam 109 which is vertically slidable on the rod to a position in front of a projection 110 of the spout 5, shown in broken lines in Fig. 3. These parts are shown more in detail in Fig. 8. The cam 109 is made with an extension 111 with a perforation which registers with the perforation 106a of the lug 106 when the cam 109 is in upper position shown in broken lines in Fig. 3. When in this position the padlock 112 may be put through the perforations in the lugs 105, 106 and the extension 111 whereby the cam 109 is locked in the upper position. While the cam 109 is locked in this position, the spout 5 cannot be turned because the projection 110 will engage the cam 109 and prevent movement. Thus the spout 5 and the pump are locked from operation at the same time.

It was above stated that the record seal 42 becomes partially mutilated in order to open the refill cover 7 and that a new record seal must be inserted before the covers again are closed. In Fig. 21 is shown in detail a plunger 113 seated in the flange 114 of the rim casting 6 and provided with an enlarged head 113a. A resilient member 115 is shown in Fig. 21 normally to urge the plunger 113 upward. This member is fitted at its outer end to support a pin 116 and to elevate this pin into a socket 117 in the plate 16 and face of the dome portion of the cover 8, when the cover 8 is fully opened. This device is shown in position in broken lines in Fig. 19, and the head of the plunger 113a and the end of the pin 116 in full in cutaway portions.

When the lower cover 7 is raised and the record seal 42 removed, the plunger 113 is free to rise and to force the pin 116 upward. Should the operator close the cover 7 without inserting a new record seal and attempt to swing the upper cover 8 into closed position, the pin 116 holds the cover 8 open until the enlarged head 113a is depressed, but this head now is below the lower cover 7. It might be possible for the operator to depress the enlarged head 113a and to swing the cover into closed position, but this would only result in leaving a permanent record that the operator had failed to put in a new record seal. Hence, it is necessary to replace the record seal in order properly to operate the devices.

It is desirable to provide means whereby an operator is prevented from opening the cover 8 until the liquid in the tank is reduced to a predetermined level; to prevent refilling the tank until the liquid has reached a predetermined level and means adjustable to predetermined levels. These objects are accomplished in the following manner:

Within the tank a float 118 is carried on a rod 119 and is adjustable on the rod by means of the retainer 120 which is identical with the retainer 94 previously described and shown in detail in Fig. 9. The retainer 120 engages in notches 119a and 119b to locate the float 118 at predetermined levels. The rod 119 passes upward through a drill hole in the cover plate of the tank body 1, through the member 6a which is an extension of the rim casting 6, and through the plate 53 to enter a corresponding drill hole through plate 16 and into the dome member 8a, as shown in Fig. 12, when the dome member, and with it the cover 8, is turned to bring the drill holes in register. The drill holes register when cover 8 is in closed position. A fixed washer 121 is secured to the rod 119 at a point to prevent lowering the float 118 beyond a predetermined level.

When the tank is filled with liquid so as to submerge the float 118, the float is urged upward at all times by reason of its buoyancy. If the covers 7 and 8 are closed properly, the float thrusts the rod 119 upward until it engages in the drill hole in the dome member 8a thus securing the cover 8 from being opened. When the liquid is removed from the tank until it reaches a level when the float is no longer urged upward but falls, the float draws the rod downward until it leaves the drill hole in the member 8a allowing the cover 8 to be opened.

To prevent the rod from being withdrawn from the drill hole in member 6a, it extends to strike the bottom of the tank at the proper time.

Figure 10:
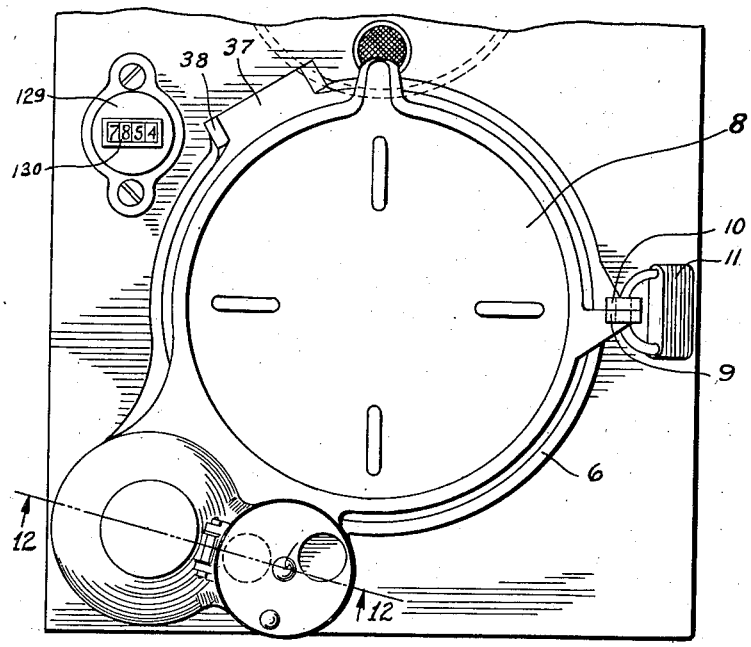
Fig. 10 is a fragmentary plan view of a device embodying the invention and showing the refill control mechanism substantially in agreement with Figs. 1 and 2.

It is important that an operator may know, at all times, how many units of measure of liquid he may have in the tank. This object is accomplished by the following means: Within the tank is a float 125 arranged to slide freely on a vertically fixed rod 126 and supported on a sprocket chain 127. The chain 127 passes over a sprocket 128 of an indicating device 129 having an indicating dial 130. The arrangements of these parts are shown in Fig. 2 and the face of the indicating device in Fig. 10. The chain 127 passes over an idle sprocket or pulley 131 and has a counter-balance weight 132 on its end. If the capacity of the tank is 120 units of measure, as in the present description quarts, the dial should read from 0 to 120 and be arranged so that when the float is at its highest point of travel, the dial should indicate 120 and when the float is at its lowest point of travel, the dial should indicate 0. As the liquid is drawn off, the float falls and turns the dial to indicate the number of units of measure remaining in the tank.

A modified structure embodying the invention herein described is shown in Figs. 23, 24, 25 and 26, as adapted to the closure of a gasoline refill pipe of a gasoline tank and involves only such structural changes as are necessary to accommodate the device to a different purpose. As this modified form is fully and sufficiently described in our co-pending application Serial Number 747,356 filed October 8, 1934, of which this application is a continuation in part, it is not deemed necessary to repeat the description here.

Having thus described our invention, what we claim is:

1. In a liquid dispensing apparatus, the combination with a tank, of means for dispensing liquid from said tank, refill control mechanism, a recording seal in said mechanism, means responsive to liquid level variations within said tank for controlling the operation of said dispensing means, means associated with said recording seal for controlling the operation of said refill control mechanism, and means actuated by a liquid level responsive means to cooperate with said recording seal associated control means to control the operation of the refill control mechanism.

2. The combination with a tank, of means for dispensing liquid from said tank, a refill control mechanism, a recording seal controlling the operation of said refill control mechanism, and means responsive to liquid level variations within said tank for controlling the said refill control mechanism.

3. In a liquid dispensing apparatus, the combination with a tank, of a pump for drawing liquid from said tank, a refill control mechanism, a float in the tank responsive to liquid level variations, and means associated with said float for controlling the operation of said pump and of the said refill control mechanism.

4. The combination with a tank, of a pump, registering mechanism associated with said pump, a member in said tank responsive to liquid level variations, said member having a control rod vertically extending and operatively associated with a locking member normally held inoperative by said rod, said locking member having a recess with which said control rod registers when the liquid level responsive member reaches a predetermined position to permit said locking member moving into operative position to lock said pump and said registering mechanism against operation.

5. The combination with a tank, of a pump, registering mechanism associated with said pump, an operating shaft in said pump, a ratchet wheel on said shaft, a locking member constructed and arranged to engage said ratchet wheel to prevent operation of said pump and said registering mechanism, a member within said tank responsive to liquid level variations and having a rod and an arm engaging said locking member normal to maintain the latter inoperative, the locking member having a recess with which said arm registers when said member responsive to liquid level variations reaches a predetermined liquid level in the tank whereby said locking member is permitted to engage said ratchet wheel.

6. The combination with a tank, of a pump, registering mechanism associated with said pump, an operating shaft in said pump, a removable operating handle constructed and arranged to seat in said shaft, a ratchet wheel on said shaft, a member in said tank responsive to liquid level variations, a locking bar constructed and arranged to engage said ratchet wheel to prevent operation of said pump and said registering mechanism, a rod and an arm normally maintained by said liquid level responsive device in engagement with said locking bar to hold said locking bar out of engagement with said ratchet wheel until said liquid level responsive member has reached a predetermined level, and manually operated means to release said locking bar from engagement with said ratchet wheel.

7. The combination in a tank, a pump having a liquid receiving chamber, a registering device associated with said pump constructed and arranged to register units of measure of liquid passing through said chamber, a fractional registering device constructed and arranged to register slight or fractional movements of said pump and liquid passing through said chamber, a member responsive to liquid level variations having a rod and an arm, a stop member constructed and arranged to prevent operation of said pump, said arm normally held by said liquid level responsive member, in engagement with said stop member to prevent said stop member from stopping operation of said pump until said liquid has reached a predetermined level, and manually operated means to release said stop member from stopping operation of said pump.

8. In a device as described, a tank inlet, means making a single movement for completely closing and opening said inlet, means locking the first means, and manually-operative means, effective upon receipt of a token to release said locking means for manual opening and closing operation accompanied by the expulsion of another token and to provide a tell-tale record of the opening and closing of the inlet.

9. In a device as described, a pump, a swivellable return pipe associated with the discharge spout of said pump, a pump case, a rail alongside said case, a finger on said rail manually slidable on said rail to engage said return pipe to prevent swivelling of said pipe, and means for locking the finger in its last-named position.

10. In a device as described, a container for fluids having a filler opening, a closure movable into a position to bar said opening, and having a socket, a rectilinearly guided plunger rod carrying a float in said tank at a predetermined distance below said opening to permit fluid to fill the tank above and below said float to press the plunger rod into the socket of the closure to prevent movement of the latter, said float descending in unison with the fluid level in said tank to a predetermined point causing the plunger rod to be withdrawn from said socket.

11. In combination with a tank for fluids having a filler opening, a cap movably secured to the top thereof and surmountable over said opening to close the latter, and having a socket, a rod in said tank, a float movable to various positions on said rod, said float being controlled by the volume of fluid in said tank to raise said rod, so it will enter the socket in said cap and prevent movement of said cap, said rod descending when the column of fluid descends and disengages said rod from said socket.

12. In a device as described, a tank having a filler opening, a cap movable into engagement with or disengagement from said opening, and having a socket, a vertical rod extending in the tank having its upper end projecting releasedly into said socket and carrying at its lower end at a point above the bottom of said tank a float designed to be supported in the fluid contents of the tank, said rod rising and descending as said fluid contents rises and falls, said rod having a vertically spaced apart series of notches, and a catch on said float adapted to be manually positioned and automatically snap into any of said notches to vary the vertical position of the float upon said rod.

13. In a device as described, a container having a filler opening, means for disengageably closing said opening, an upright stick movably guided in said tank and having a successive series of calibration notches thereon for the purpose of defining variable vertical distances below the said opening, a float slidably mounted for vertical movement in said tank upon said stick, and manually stationed at any predetermined notch thereof, and means whereby the pressure of fluid against the bottom of said float may cause said stick to lock said means against disengagement from said opening.

14. In a device as described, a tank for fluids having a measuring-chamber in which measured quantities of fluid is introduced, and means operable as said fluid is discharged out of said chamber to measure, record and indicate, at each total or partial discharge operation, the exact amount of fluid discharged out of said measuring-chamber.

15. In a device as described, a tank for fluids having a means for expressing the contents thereout, a measuring-chamber for fluid having means for fluid filling and emptying, said chamber having provision for receiving a definite quantity of fluid therein from said tank for fluid measuring purposes, means for visually counting interchangeably and automatically single or plural emptyings of said chamber and partial emptyings thereof, for fluid discharge recording purposes.

16. In a safety dispenser as described, the combination of an extended counter having a shaft, a gear inside of said dispenser mounted on the said shaft, an idler gear, a chain trained on both gears in such a manner as to have two parallel stretches on the ends of both of which are secured counter-balancing weights, one of said weights being a float resting upon the fluid contents of said dispenser so as to rise and fall in unison with the said fluid contents, to thereby operate said chain and said counter.

17. In combination with a fill-pipe, a collar embracing the same, a closure pivoted to said collar, means whereby said closure may be swung on its pivot, a spring-tensioned lock bolt to lock said closure on said pivot, and a spring tensioned latch bolt to lock said collar on said fill-pipe.

18. In a liquid dispenser, a tank, dispensing means on top of said tank, means vertically extending through said tank for controlling said dispensing means, liquid level responsive means actuating said controlling means, and means on the latter for limiting upward movement of said liquid responsive means at predetermined elevations throughout the tank.

19. In a liquid dispenser, a tank, dispensing means on top of said tank, means vertically extending through said tank for controlling said dispensing means and provided with notches throughout the height of the tank, a float actuating said controlling means, and means engaging any one of said notches to stop said float at any desired height within the tank.

20. In a liquid dispenser, a tank, dispensing means, means vertically extending through said tank for controlling said dispensing means, liquid level responsive means actuating said controlling means, and means on the latter manually operable from without the tank to limit the upward movement of said liquid level responsive means.

21. In a liquid dispenser, a tank, dispensing means, means vertically extending through said tank for controlling said dispensing means and provided with notches throughout the height of the tank, a float actuating said controlling means, and manually operable means for engaging any one of said notches to limit the upward movement of said float.

22. In a liquid dispenser, a tank, dispensing means on said tank, means vertically extending through said tank for controlling said dispensing means and provided with notches throughout the height of the tank, a float slidable on said controlling means, and a member operable from without the tank to engage any one of said notches to limit the upward movement of said float.

23. In a liquid dispenser, a tank, a dispensing mechanism, control means for the latter including a vertical rod notched throughout its length, a float slidable thereon, and means manually operable from without the tank to engage one of said notches to limit the rise of said float on the said rod.

24. In a liquid dispenser, a tank, dispensing means on said tank, means vertically extending through the tank for controlling said dispensing means, liquid level responsive means actuating said controlling means, means on the latter for limiting upward movement of said liquid responsive means at predetermined elevations throughout the tank, and means fixed on said controlling means for limiting the downward movement of said liquid responsive means.

25. In a liquid dispenser, a tank, dispensing means, means vertically extending through said tank for controlling said dispensing means, liquid level responsive means actuating said controlling means, and means operable from without the tank for setting said liquid level responsive means to limit the amount dispensable.

26. In a liquid dispenser, a tank, dispensing means having a feed pipe leading to the bottom of the tank, means vertically extending through the tank for controlling said dispensing means, a float for actuating said controlling means, means on the latter for limiting the upward movement of said float, and means at the bottom of said controlling means for arresting said float above the feed pipe entrance in order not to break the liquid seal.

RALPH G. WHITLOCK.
LEWIS SHARP.